United States Patent
Radichkov

(10) Patent No.: US 10,733,244 B2
(45) Date of Patent: Aug. 4, 2020

(54) DATA RETRIEVAL SYSTEM

(71) Applicant: OLX BV, Hoofddorp (NL)

(72) Inventor: Dobromir Radichkov, Dubai (AE)

(73) Assignee: OLX BV, Hoofddorp (NL)

( * ) Notice: Subject to any disclaimer, the term of this patent is extended or adjusted under 35 U.S.C. 154(b) by 163 days.

(21) Appl. No.: 15/787,651

(22) Filed: Oct. 18, 2017

(65) Prior Publication Data

US 2018/0137198 A1    May 17, 2018

(30) Foreign Application Priority Data

Nov. 15, 2016 (GB) .................... 1619340.1

(51) Int. Cl.
| | | |
|---|---|---|
| *G06F 16/951* | (2019.01) | |
| *G06Q 30/06* | (2012.01) | |
| *H04L 29/08* | (2006.01) | |
| *G06F 16/957* | (2019.01) | |
| *G06F 16/435* | (2019.01) | |
| *G06F 16/903* | (2019.01) | |

(52) U.S. Cl.
CPC .......... *G06F 16/951* (2019.01); *G06F 16/437* (2019.01); *G06F 16/903* (2019.01); *G06F 16/957* (2019.01); *G06Q 30/0601* (2013.01); *H04L 67/22* (2013.01)

(58) Field of Classification Search
None
See application file for complete search history.

(56) References Cited

U.S. PATENT DOCUMENTS

| 7,698,331 B2 | 4/2010 | Carson, Jr. et al. |
| 7,725,464 B2 | 5/2010 | Grubb et al. |
| 7,779,014 B2 | 8/2010 | York et al. |
| (Continued) | | |

FOREIGN PATENT DOCUMENTS

| WO | WO 03/010689 | 2/2003 |
| WO | WO 2007/124762 | 11/2007 |
| WO | WO 2008/012601 | 1/2008 |

OTHER PUBLICATIONS

Baluja et al., "Video Suggestion and Discovery for YouTube: Taking Random Walks Through the View Graph", Proceedings of the 17th international conference on World Wide Web, Apr. 21-25, 2008, pp. 895-904, ACM, New York, NY, USA.

*Primary Examiner* — Kim T Nguyen
(74) *Attorney, Agent, or Firm* — Buckley, Maschoff & Talkwalkar LLC

(57) ABSTRACT

A computer-implemented method of retrieving data in a data management system is disclosed. The data management system is adapted to enable system users to submit and share content items. Content items are stored in a database, each content item associated with an item creator. Activity data relating to user interactions with content items is also recorded. The activity data is analysed, the analysis comprising, for each of a plurality of users: analysing activity data relating to content items submitted by the user; and assigning a user classification to the user in dependence on the analysis of the activity data. Search requests are then processed by sorting retrieved content items in accordance with a sort order determined in dependence on user classifications assigned to the item creators of the retrieved content items.

18 Claims, 4 Drawing Sheets

(56) References Cited

U.S. PATENT DOCUMENTS

| | | | |
|---|---|---|---|
| 8,005,715 B2 | 8/2011 | Smith et al. | |
| 2007/0067304 A1 | 3/2007 | Ives | |
| 2008/0040221 A1 | 2/2008 | Wiseman et al. | |
| 2009/0083365 A1* | 3/2009 | Feldman | G06F 16/9537 709/201 |
| 2012/0306894 A1 | 12/2012 | Gottschlich et al. | |
| 2013/0297581 A1* | 11/2013 | Ghosh | G06F 16/337 707/706 |
| 2014/0081943 A1* | 3/2014 | Gross | G06F 16/24578 707/706 |
| 2014/0304584 A1* | 10/2014 | Taylor | G06F 16/958 715/234 |
| 2016/0042069 A1* | 2/2016 | Lee-Goldman | G06F 40/295 707/706 |
| 2016/0117390 A1* | 4/2016 | Glance | G06F 16/245 707/706 |

* cited by examiner

DATA RETRIEVAL SYSTEM

RELATED APPLICATION

This application is based on and claims priority to Great Britain Patent Application No. 1619340.1 entitled "Data Retrieval System," which was filed Nov. 15, 2016, which is hereby incorporated by reference in its entirety.

BACKGROUND

The present invention relates to systems and methods for processing, analysing and retrieving data content in a data storage system.

Information systems are known in which users can submit units of content, often referred to as posts or listings, for display to other users. Examples of such systems include collaboration systems, social media networks, e-commerce systems, video sharing sites, and the like. Search tools are generally provided to allow users to identify relevant posts or listings. However, in many such systems, the number of available posts or listings can be vast, and even using search tools, the results identified can still be overwhelming. Generally, only a limited number of results can be displayed on a user's screen (with limitations more severe on mobile devices). Furthermore, bandwidth limitations mean it is often undesirable to transmit full sets of results (which could comprise many hundreds or even thousands of listings) to a user device. Conventional approaches to tackling this problem sort results by posting date or time, so that only the most recent posts are presented, at least in a first group (or page) of results. However, there is no guarantee that these represent the most relevant or useful results, and this approach provides no flexibility in how the search results are ordered or which results are provided to the user.

SUMMARY

Embodiments of the invention seek to provide alternative approaches to manage large volumes of content items in such a system, and to enable more intelligent prioritisation of search results and thereby optimise use of screen real estate and network bandwidth.

Accordingly, in a first aspect of the invention, there is provided a computer-implemented method of accessing data content in a data management system, the data management system adapted to enable system users to submit and share content items, the method comprising: storing a plurality of content items in a database, each content item associated with an item creator, wherein the item creator is a system user who submitted the content item; recording activity data relating to user interactions with content items; analysing the activity data, the analysing comprising, for each of a plurality of users: analysing activity data relating to content items submitted by the user; and assigning a user classification to the user in dependence on the analysis of the activity data. The method may further comprise receiving a search request specifying one or more search criteria; identifying a plurality of content items in dependence on the search criteria; sorting the identified content items in accordance with a sort order determined in dependence on user classifications assigned to the item creators of the identified content items; and outputting search results identifying at least a subset of the identified content items, the search results sorted in accordance with the sort order.

The sort order may be determined such that, for one or more of the content items, placement of a content item in the sort order is dependent on the user classification assigned to the item creator of the content item.

The analysing step may comprise, for a given user, determining an interaction count (or other metric) indicating a number of (or otherwise quantifying) user interactions, preferably of a predetermined interaction type (e.g. replies), by other users with content items submitted by the given user, and assigning a user classification to the user based on the interaction count. Alternatively or additionally, the analysing step may comprise, for a given user, determining a submission count (or other metric) indicating a number of (or otherwise quantifying) content items submitted by the user, and assigning a user classification to the user in dependence on the submission count. In one embodiment, a user classification is assigned to a given user in dependence on both the interaction count and the submission count.

In one embodiment, the method comprises comparing one or both of the interaction count and the submission count to corresponding interaction or submission counts of one or more other system users, and assigning the user classification based on the comparison. The method may comprise comparing the user to a cohort of users, optionally including all users (where the cohort may include the user). More specifically, the method may include one or more of: assigning a first category to a user having a higher interaction count than a first predetermined proportion of the cohort and a higher submission count than a second predetermined proportion of the cohort; assigning a second category to a user not having a higher interaction count than the first predetermined proportion of the cohort and not having a higher submission count than the second predetermined proportion of the cohort; assigning a third category to a user having a higher interaction count than the first predetermined proportion of the cohort and not having a higher submission count than the second predetermined proportion of the cohort; assigning a fourth category to a user not having a higher interaction count than the first predetermined proportion of the cohort and having a higher submission count than the second predetermined proportion of the cohort.

In one embodiment, the method comprises storing a priority attribute for each content item, the sort order determined in dependence on the priority attributes of the identified content items. The priority attributes of one or more of the content items are preferably determined in dependence on the user classifications. More specifically, for one or more content items, the value of the priority attribute of a given content item having a given item creator may be dependent on the user classification of the item creator.

The method may comprise setting an initial value for the priority attribute of each content item when the content item is created; analysing the activity data (as set out above); and modifying the priority attribute value of one or more content items in dependence on the analysis. The priority attribute value of a given content item is preferably modified in dependence on the user classification assigned to the item creator of the content item. The modifying step may comprise one or more of: increasing the priority attribute value; decreasing the priority attribute value; and setting the priority attribute value to a predetermined value.

The analysing step, in one embodiment, further comprises determining for each content item an interaction count (or other metric) specifying a number of (or otherwise quantifying) interactions with the content item, such as of a predetermined interaction type, and performing the modifying step in dependence on the interaction counts. The interaction count is, in one embodiment, determined over a predetermined time window. The method may comprise, for a given content item, comparing the interaction count to a predetermine threshold, the modifying step performed in dependence on the comparison.

In one embodiment, the method comprises computing a plurality of interaction counts (or other metric) for each content item, each interaction count relating to user interaction over a respective time window. Multiple interaction counts defined over respective time windows may then be compared to respective thresholds.

The method may comprise performing the modifying step in dependence on a set a rules, each rule specifying one or more rule conditions and a modifying action. The method may include, for each of a plurality of content items: determining one or more rules of the set of rules applicable to the content item in dependence on the rule conditions; and performing the modifying actions specified by the determined applicable rules. The method may comprise, in response to the determining step, recording the modifying actions in an action list, the performing step comprising transmitting the action list to the content item database, and applying the actions at the content item database.

In one embodiment, a rule condition for a given rule may specify one or more user categories to which the rule applies and/or one or more content item categories to which the rule applies.

A rule condition for a given rule may specify a user interaction threshold, and optionally a time window associated with the interaction threshold. The method may then comprise determining that the rule applies to a given content item based on comparing an interaction count determined for the content item, such as over the specified time window, to the specified threshold.

In various embodiments, rule actions may comprise one or more of: a promote action to promote a content item, where promoting a content item comprises setting the content item's priority attribute to a value indicating an increased priority; a demote action to demote a content item, wherein demoting a content item comprises setting the content item's priority attribute to a value indicating a reduced priority; a suspend action to suspend a content item, wherein the system limits interaction with suspended content items and/or wherein suspended content items are not included in search results. A given promote or demote action optionally specifies a parameter indicating a priority increment or decrement or an absolute priority value, the modifying step comprising modifying the priority attribute of a content item to which the rule applies in accordance with the specified parameter. The rules may be configurable and/or stored in a rules database.

In one embodiment, the analysing step is performed prior to (and/or independently of) receipt of the search request and/or is repeated periodically.

Analysing activity data, in one embodiment, comprises analysing a predetermined type of user interactions with content items, the predetermined type of user interactions comprising reply actions performed in relation to content items by users other than the item creators. Reply actions may comprise one or more of generating a reply message to a content item; invoking a communication function of a user device, for example a call or messaging function; accessing contact information associated with a content item; initiating a purchase offer or purchase transaction through the data management system.

Priority attributes associated with content items may comprise date and/or time values. The method may comprise setting an initial value of a priority attribute for a content item to a value specifying a creation or submission time of the content item (e.g. this may be done at creation/submission time).

In example embodiments, content items comprise posts or listings in a communication or electronic marketplace system, such as wherein content items define products or services offered for sale.

In further aspects or embodiments of the invention, which may be combined with the above aspects, a computer-implemented method of accessing data content in a data management system is provided, the data management system adapted to enable system users to submit and share content items, the method comprising: storing a plurality of content items in a database, each content item associated with an item creator, wherein the item creator is a system user who submitted the content item, and a priority attribute; recording activity data relating to user interactions with content items; accessing a plurality of prioritisation rules, each rule specifying one or more rule conditions and a prioritisation action; analysing content items to determine prioritisation rules applicable to the content items based on the rule conditions; performing the prioritisation actions specified for the rules determined as applicable, wherein performing prioritisation actions comprises modifying priority attributes of content items; and in response to content item search requests, outputting search results listing content items in dependence on their priority attributes. "Prioritisation" may refer to rules/actions that increase or decrease priority (e.g. to promote or demote content items).

In a further aspect of the invention, which may be combined with either of the above aspects, a computer-implemented method of accessing data content in a data management system is provided, the data management system adapted to enable system users to submit and share content items, the method comprising: storing a plurality of content items in a database, each content item associated with an item creator, wherein the item creator is a system user who submitted the content item; recording activity data relating to user interactions with content items; receiving a search request specifying one or more search criteria; identifying a plurality of content items in dependence on the search criteria; sorting the plurality of content items in accordance with a sort order determined at least in part in dependence on the recorded activity data, such that, for one or more content items, placement of a content item having a given item creator in the sort order is dependent on user interactions with other content items submitted by the given item creator; and outputting search results identifying at least a subset of the identified content items sorted in accordance with the sort order.

The method in accordance with any of the above aspects may further include any of the features set forth herein.

In another embodiment, the invention also provides a system, apparatus, or computing device, having means, optionally in the form of a processor with associated memory, for performing any method as set out herein, and a (tangible, non-transitory) computer-readable medium comprising software code adapted, when executed on a data processing apparatus, to perform any method as set out herein.

Embodiments of the invention extend to methods and/or apparatuses substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

DRAWINGS

Various features of embodiments of the present invention will now be described, purely by way of example, with reference to the accompanying drawings, in which:—

DETAILED DESCRIPTION

Embodiments of the invention provide a system for prioritising content items during data retrieval, for example by imposing a priority ordering on search results. In various embodiments, the content items are posts or listings in an online marketplace. However, the described approaches can be applied to any type of information management system where content items are submitted by users and made available to other users, including messaging systems, social networks, message forums, video sharing sites, review sites allowing users to submit product/service reviews etc.

Figure 1:
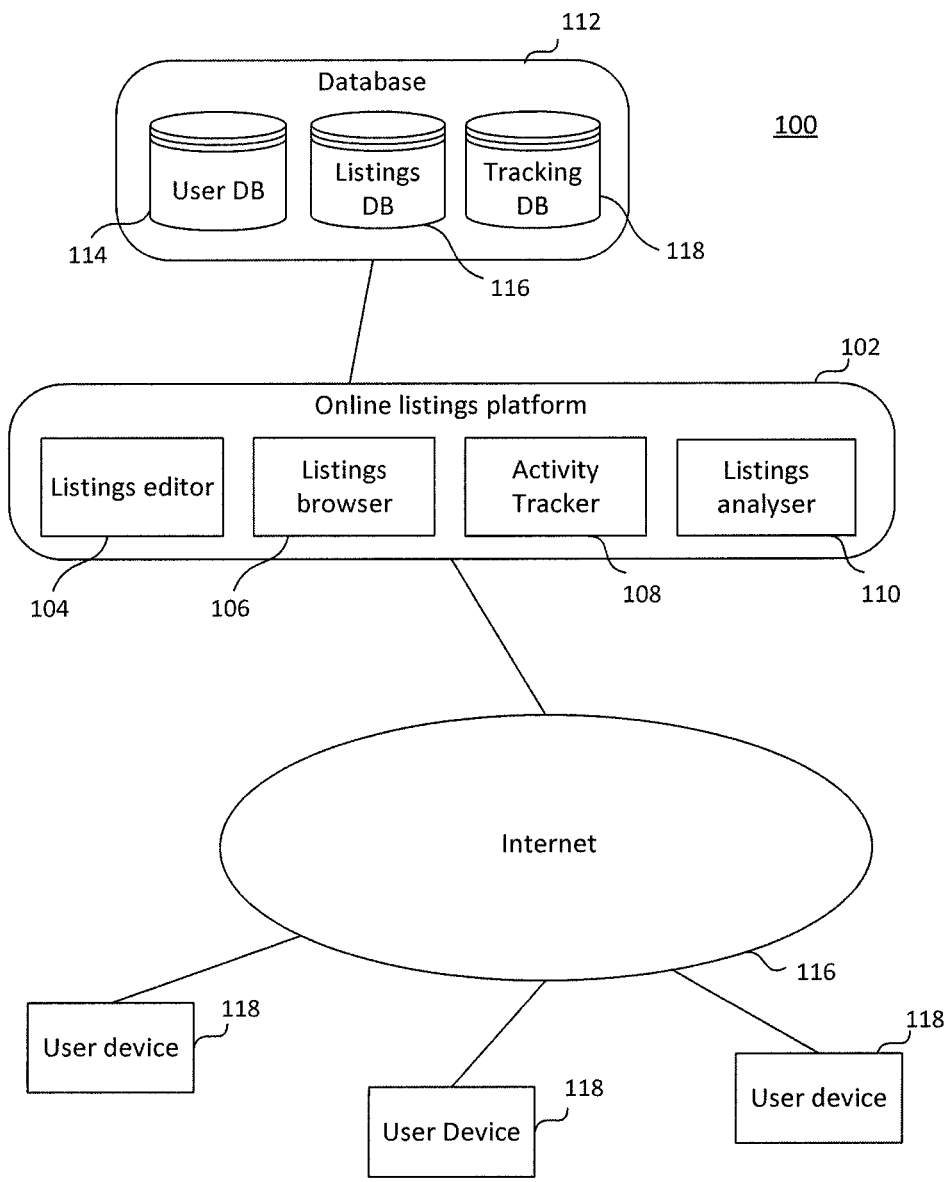
FIG. 1 illustrates a system including an online listings platform in overview according to one embodiment.

An embodiment is illustrated in overview in FIG. 1 in the form of content management system 100. The system comprises an online listings platform 102 implementing an online marketplace (e.g. a "classifieds" service), connected to a database 112.

Database 112 includes user database 114, listings database 116 and activity tracking database 118. User database 114 stores information associated with users of the system (e.g. as a set of user accounts), including, for example, name/address information, login credentials (e.g. account names/passwords), user preferences, and the like. Listings database 116 stores listings created by users. Such listings may, for example, describe products for sale in an online marketplace. Data stored may include description, price, images, validity periods, shipping information and the like. Tracking database 118 stores tracking information relating to user activity in the system, in particular relating to user interactions with listings.

While shown illustratively as logically separate databases, databases 114, 116, and 118 could be stored in a single database or as physically separate databases, on a single server or across multiple servers, in any appropriate fashion. The databases may be implemented using any appropriate data storage/management technologies, including flat files, structured (e.g. relational) databases, document-oriented databases etc. In one particular example, user database 114 and listings database 116 may be stored in an Amazon Redshift data warehouse, and the tracking data may be stored by the activity tracker (see below) initially in the form of raw data files in cloud storage (e.g. Amazon S3) and subsequently ingested into the Redshift data warehouse and brought into relational form for subsequent processing.

The online listings platform 102 includes a listings editor module 104, listings browser 106, activity tracker 108 and listings analyser 110. Listings editor 104 allows users to manage their listings in the system, including creating, editing and deleting listings. Each listing in the system is associated with a particular user that created the listing and a listings category. The listings categories typically correspond to product categories. Thus, examples of categories may include vehicles, mobile phones, Hi-Fi equipment, books, etc.

Listings browser 106 provides functionality for users to view and interact with listings. The listings browser includes a search function allowing users to specify search criteria (e.g. one or more listings/product categories and/or one or more keywords). The listings browser identifies listings matching the search criteria and outputs them e.g. as a search result page. The listings browser further provides for detailed display of individual listings, e.g. in the form of a listing page showing the listing information (such as product description, image(s), price etc.).

The listings browser also provides facilities for interacting with listings. In particular, a user may create a reply to a listing, where a reply may comprise a request for additional information, a purchase offer, or the like. The reply could take the form of a message (e.g. in text form) entered via a web interface, with the platform providing an internal messaging/chat function for communication between users (or interfacing with an external one). Other forms of reply functionality could include a call button or SMS button for activating cal/SMS functionality on a mobile device or other means for invoking external communication functions. As a further example, the listing may be displayed with contact information to allow users to make contact independently. In a preferred embodiment, user interaction (e.g. clicking of a button) may be required to reveal the contact information of the seller (the user having created the listing). This allows the system to still track the interaction as a reply (or potential reply) even though the communication is not directly triggered by the listings platform.

Alternatively or additionally, the web interface could provide an interface for entering offer information (e.g. a price offered). Thus, a reply could simply constitute a numerical value defining an offer price, linked to a user ID of the user making the offer.

Note that the listings editor 104 and listings browser 106 represent backend components (and hence are shown as part of backend platform 102) providing editing, display, search and interaction functions relating to listings. The listings editor and browser functions may be invoked by client software (e.g. a web browser) at the user device using suitable API calls. In practice, the listings editor and listing browser components may be implemented as a web application backend, responding to API calls from the client device and retrieving data from/writing data to the database layer 112 as required.

In one embodiment, after exchange of information through the listings platform, purchases are conducted by users through external channels. However, in alternative embodiments, purchases could be facilitated or processed by the listings platform itself. In that case, purchase actions could be recorded as "replies" or could be tracked as a separate class of interaction.

The listings interface provided by the listings browser may provide any or all of the above forms of reply functionality.

Activity tracker 108 tracks user interaction with listings and records relevant activity relating to the listings in activity tracking database 118. Relevant activity tracked may, for example, include: creation/editing/deletion of a listing; inclusion of a listing in search results displayed to a user (whether or not subsequently viewed), viewing of a listing (e.g. by clicking on the listing in a search result), creation of a reply (e.g. by any of the means described above) etc. All user interactions are recorded in the tracking database 118 with timestamps indicating when the interaction occurred and with a user identifier of the user performing the interaction (where known). The user ID may, for example, be known if the user is logged into the platform or is accessing the platform via a device known to the platform (e.g. via a cookie, mobile device identifier or the like). Where the user is not known, activity may be recorded against other identifying information, such as a cookie of the user's device.

Listings analyser 110 analyses listings in the listings database 114 and associated activity information in tracking database 118. The analysis is used to classify users based on their listings and associated system activity, and evaluate the user interaction relating to listings. The resulting user classifications and listings activity data are used to update priority information associated with listings, with the priority information used in determining search result ordering by the listings browser 106.

Note that, while shown as (logically) separate modules 104, 106, 108 and 110, these modules can be combined (or further subdivided) in any suitable fashion to implement equivalent functionality. The modules may be executed on a single computing node (e.g. server) or distributed across multiple nodes in any suitable manner.

Users interact with the listings platform 102 over a network 116, e.g. the Internet, using a variety of user devices 118. User devices could include, e.g., personal computers, smartphones, tablet computers, smartwatches, or any other mobile or non-mobile devices. The user front-end may be implemented, e.g. in the form of a web interface provided by the platform 102 and accessed using a web browser at the user device, or in the form of dedicated client applications or other services provided on user devices, such as mobile applications on a smartphone, voice-activated applications on various user devices and the like.

Prioritisation of Listings

In preferred embodiments, the listings browser 106 prioritises listings, for example by imposing an ordering on listings displayed to a user (e.g. when viewing listings in a particular listings category or performing a search). The prioritisation/sort order is manipulated by the listings analyser 110.

Prioritisation is achieved by ordering listings based on a priority attribute provided for each listing. In one example, the priority attribute is simply the posting date (i.e. the date when a listing was created), with listings sorted based on the posting date.

However, in one embodiment, the priority attribute is in the form of a timestamp field which is initially set to the same value as the posting date when the listing is created, but which can subsequently be manipulated without affecting the actual posting date (note the timestamp field could specify a date and/or time value in any suitable manner, such as a date-time value, a data value only, a number of seconds since a reference time etc.).

Manipulation of the priority timestamp can be used to promote a listing (also referred to as "bumping" a listing), i.e. moving it to a higher (earlier) position in the search order, and demote a listing (also referred to as "debumping" a listing), i.e. moving it to a lower (later) position in the search order.

Use of a proxy timestamp field instead of the posting date itself allows manipulation of the search order without changes to the posting date that would otherwise be visible to users and which could be seen as confusing or misleading.

Instead of a timestamp field, any other appropriate form of priority information could be used as the priority attribute, e.g. a numerical priority value, a priority classification, or the like.

Listings Analysis and User Segmentation

The listings analyser 110 analyses activity tracking data relating to listings and makes decisions on manipulating the priority timestamps associated with listings in order to affect the order in which listings are output (e.g. during search).

The analysis performed by listings analyser 110 involves two main components. Firstly, performance of individual listings is evaluated against performance metrics, referred to as key performance indicators (KPIs). Secondly, users are classified into one of a predefined set of classifications based on their posting activity and interactions with those posts by other users. This process is referred to as user segmentation.

Figure 2:
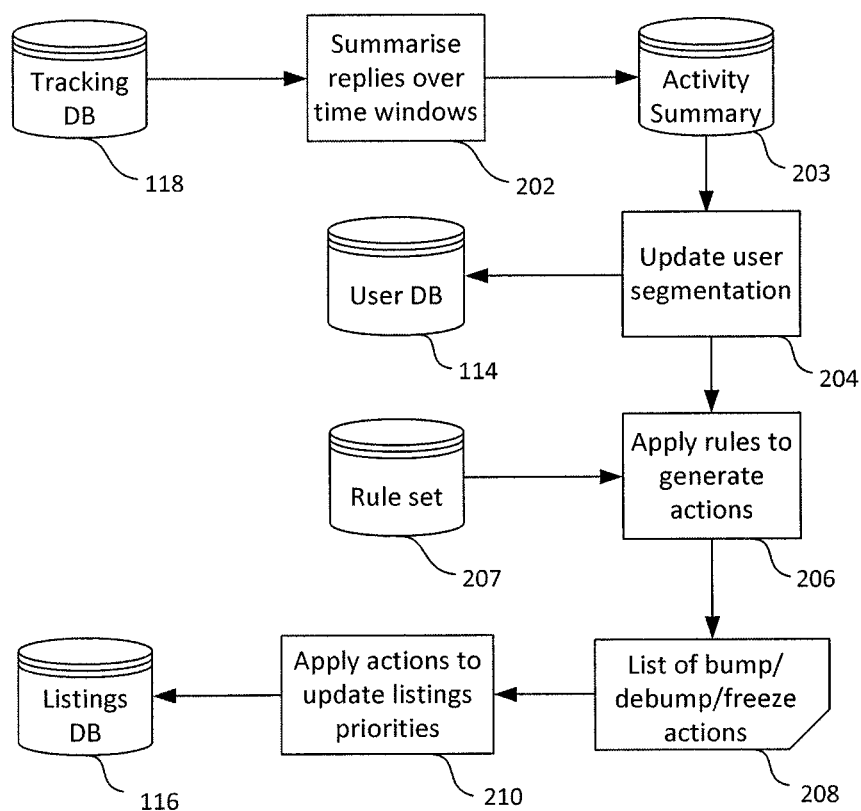
FIG. 2 illustrates a process for analysing activity information relating to listings and manipulating a listing search order according to one embodiment.

The listings analysis process is summarised in FIG. 2.

In step 202, the activity tacking data recorded in tracking database 118 is processed. This involves aggregating activity for individual listings and/or users. For example, the following information may be aggregated:

Number of listings posted by each user
Number of replies received for each listing
Number of replies received by each user for their listings (which can be derived from the individual listings' reply counts)

Aggregation is performed over a defined time period. Any suitable time period may be used. In one example, aggregation is performed over a defined duration up to the present time (e.g. for the past four weeks). Alternatively, all available data could be processed in the aggregation. Optionally, the data may be filtered or otherwise pre-processed (e.g. to exclude activity records meeting certain characteristics from the analysis).

In one embodiment, the reply counts for each listing are accumulated over multiple different time windows (which may relate to corresponding KPI time windows as discussed further below). The time windows may be defined in relation to the posting date (or other relevant date) of each listing.

As an example, the following information might be calculated for each listing:

TABLE 1

| Listing ID | Replies within 3 days of posting | Replies within 1 week of posting | Replies within 4 weeks of posting |
| --- | --- | --- | --- |
| 1001 | 2 | 8 | 8 |
| 1002 | 4 | 5 | 7 |
| 1003 | 0 | 3 | 4 |

Total user replies (i.e. all replies to a user's listings) could similarly be collected over multiple time windows but in the example embodiment are only collected over a single time window corresponding to the time period being analysed (e.g. the preceding four weeks). Alternatively, all replies to a user's listings since the user started using the system could be counted. In the above examples, the time window(s)

preferably extend over a defined time period starting from the posting date of the listing (e.g. X days from posting date).

The computed reply counts (both per listing and per user) are stored in an activity summary table 203 (while a single table is referenced here for simplicity, in practice the summary data may be divided across multiple tables). Process 202 runs periodically, with the summary table 203 regenerated on each iteration. In an example, the table is regenerated hourly. Between runs of the analysis, activity data is collected by the activity tracker and stored in the activity database. The listings analysis process can then make use of the new activity data on the next run.

In step 204, the user segmentation is updated. The user segmentation involves assigning each user to a predefined user class (or segment), based on posting behaviour and number of replies received. The assigned classification for each user is recorded in the user database 114 (note that in alternative embodiments the user classifications may be stored separately from the main user database, e.g. in a separate user segmentation dataset). User segmentation is described in more detail below.

In step 206, a set of predefined rules in a rule set 207 are applied based on the updated summary table 203 and user segmentation. The rules may be stored in a configuration file or database or similar. Each rule may specify one or more condition(s) and an action to be applied if the conditions are met. In a preferred embodiment, the possible actions include:
 Bumping (promoting) a listing
 Debumping (demoting) a listing
 Freezing (disabling or suspending) a listing Other actions could be used alternatively or additionally. For example, instead of or in addition to freezing, an action for deleting a listing could be specified.

An action is generated for each rule for which the conditions are fulfilled, and the resulting actions are recorded in an action list 208.

In step 210, the action list is imported to the listings database 116 and the specified actions are applied, e.g. to modify the priority timestamps of listings as specified by the actions. This step may be performed via an API call (e.g. using an HTTP request) to the listings platform.

The steps described in FIG. 2 may be performed separately from regular functions of the listings platform (e.g. by a separate server) in one embodiment. The activity tracker records activity information in the tracking database 118 which may be separate from any transaction database of the listings platform (but could also be stored in the same database). The analysis can then proceed independently, until the determined actions are applied to the listings database in step 210. Separation of the analysis functions from the regular platform operation in this way ensures that the analysis does not disrupt regular user interaction with the platform.

The analysis functions are, in one embodiment, repeated periodically. In one example, the entire process of FIG. 2 is executed periodically (e.g. hourly). However, individual steps may be decoupled and performed at different frequencies. Purely by way of example, steps 202-206 could repeated hourly, with action list 208 accumulated over multiple runs and the import into listings database in step 210 performed less frequently.

User Segmentation

The user segmentation classifies users into predetermined classifications, referred to as user segments, based on:

the number of listings created by a user, and
the number of distinct replies received to the user's listings As mentioned above, these numbers may be calculated over the whole time the user has been active or over a predetermined period up until the present time (e.g. the last four weeks). Preferably, only distinct user replies are counted, meaning that multiple replies by the same user to the same listing only count once (in alternative embodiments these could however be counted separately).

Configurable classification rules determine the user segment to which a user is assigned based on the above statistics. Optionally additional metrics or parameters may also be used in the classification.

The segmentation may be based on the absolute numbers of listings and/or replies, e.g. by applying thresholds. For example, a user with a number of listings exceeding (or below) a given threshold and/or a number of replies exceeding (or below) a given threshold may be assigned to a given category. In some embodiments, the comparison is on a relative basis, and involves determining whether a given user is within a given percentage of users having the most or least posts/replies compared to all other users (or compared to a defined cohort of users).

Figures 3, 4:
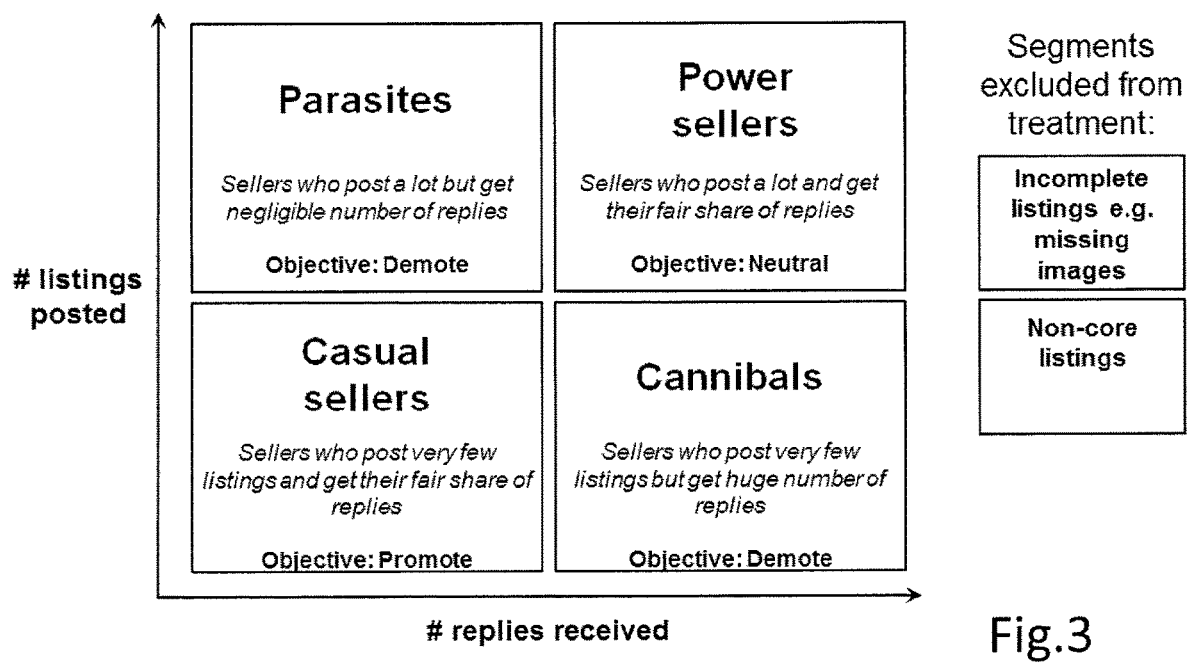
FIGS. 3 and 4 illustrate classification of users into a number of user segments according to different embodiments.

An example of a classification scheme is illustrated in FIG. 3.

In this scheme, the aim is to segment users into distinct groups based on numbers of listings posted and number of replies received. For ease of understanding, each segment is associated with a descriptive label used only to help identify certain characteristics of each segment. In FIG. 3, four major segments are shown. These segments (or classifications) may further be subdivided based on additional criteria.

FIG. 4 sets out in more detail rules underlying the segmentation. In this example, a user is classified as a "casual seller" if the number of posts by that user is in the bottom 95% compared to all other users, and if the number of replies received is also in the bottom 95%. Casual sellers are further subdivided into "trial" and "non-trial" subclasses, based on when the user's first post was made. Thus, these users are generally not very active compared to the user population as a whole, but it may be desirable to promote their listings in order to encourage use of the platform.

Users in the top 5% of sellers by number of posts and in the top 5% of sellers by replies received are assigned to the "power sellers" category. These users are thus the most active in the population, creating the most listings but also receiving the most replies. Generally, such users' listings may not need to be promoted.

A further category are "cannibals" who are in the bottom 95% of sellers by number of posts but in the top 5% by number of replies received. Thus, these users do not post many listings but receive disproportionately many replies and are thus consuming more than their fair share of user replies (and hence user attention). This may be undesirable behaviour which reduces the overall effectiveness of the system and it may therefore be desirable to demote their listings.

"Parasites" represent an opposite category of users: users who are in the top 5% by number of posts but in the bottom 95% by number of replies. This may indicate that these users are posting many low-quality listings that are not generating user interest. This may also be considered undesirable behaviour (akin to "spamming") and it may thus be desirably to demote their listings.

The above classification scheme is given purely by way of example. The specific scheme used (and the percentage thresholds) may depend on specific requirements and observed user behaviour. Note that while in this example the percentage thresholds used to segment users are the same for the two metrics (number of listings posted, number of replies received) this need not necessarily be the case.

The analysis is, in one embodiment, configurable to exclude particular types of content. For example, only listings of particular listing categories may be analysed (referred to as "core" product categories, with listings in other categories not considered (e.g., the analysis could exclude property or jobs listings).

Furthermore, certain listings may be identified as "bad content" (for example listings that do not include certain key information such as price, phone number, or a product image). Such bad content may also be excluded. Furthermore, automatic debump or freeze rules may be configured for such listings.

The excluded types of listings may be configurable by way of exclusion rules.

In the above example the number of replies is expressed in absolute terms but this could also be expressed in relative terms, e.g. as replies per listing.

Prioritisation Rules

The rules applied in step 206 of FIG. 2 link certain conditions or triggers to prioritisation actions (such as bump/debump) in order to influence listing exposure.

The main conditions or triggers used are:
KPIs, which provide an indication of whether listings are receiving adequate exposure, and
the user segments assigned to listing creators (which provide an indication of user behaviour)

The KPI analysis is based around the concept of "liquidity" of listings. Liquidity is a measure of the exposure attained by listings. In one embodiment, liquidity is determined based on the number of distinct replies received for individual listings. However, other criteria may be used to determine liquidity (e.g. total rather than distinct number of replies, total/distinct number of user views of a listing etc.).

The number of distinct replies for a listing is compared to one or more KPIs, where a KPI defines a threshold for a number of replies and a time period in which the reply threshold should be attained. Different KPIs may be defined for different listing categories (e.g. different product categories of products offered for sale via the listings platform).

Thus, as an example, a given KPI may specify that a listing needs to receive X replies in 1 week, where X may depend on the category. In one particular example, X=7 for listings in the "vehicle" category, X=6 for listings in the mobile phone category, and X=4 for all other categories. If the number of replies meets (or exceeds) the threshold number X of replies (within the specified time period, here 1 week), it is considered "liquid". An overall measure of liquidity for the active listings in the database can then be defined in terms of the percentage of listings that are liquid, i.e. that have met the relevant KPI.

The values chosen for the thresholds may be taken to indicate a likely expected average number of replies needed to achieve a sale. The thresholds may be chosen empirically, e.g. based on analysis of past listings.

One aim of the disclosed techniques is to redistribute liquidity by promoting/demoting listings, thereby increasing the overall liquidity of the active listings. For example, listings that meet their KPI(s) may be demoted (debumped) while listings that do not meet the KPI(s) may be promoted (bumped). The processing to achieve this will be described in more detail below.

In the KPI calculations, as described for user segmentation, only distinct replies are counted in one embodiment, where distinct replies are replies from the same buyer to the same seller for a particular listing. Thus, multiple replies from the same buyer on the same listing would only be counted once.

KPIs may be defined for different time windows with respective reply thresholds, and prioritisation rules may then associate different actions with the different KPIs. The time windows may correspond to the time windows for which activity data is aggregated as described above in relation to FIG. 2.

As indicated above, along with the user segments, the KPIs may be used to specify rule conditions for prioritisation rules. Evaluation of a rule then involves determining:
whether the listing meets (or, for a negative rule, does not meet) the specified KPI, and/or
whether the creator of the listing matches (is assigned to) the specified user segment.

If the listing meets the rule condition (e.g. KPI and/or user segment), then the rule applies to the listing and the action specified for the rule is implemented.

Separate rules may be defined for different types of actions, such as bumping, debumping and freezing a listing. Bumping and debumping actions may specify a parameter indicating how the priority attribute is to be modified. For example, this may be relative value by which the priority attribute of the listing is to be increased or decreased. For example, where a priority timestamp is used, a bump action may specify increasing the priority timestamp for the listing by a specified time value (e.g. a number of days or weeks) and a debump action may specify decreasing the priority timestamp by a specified amount. Alternatively, the action may specify a specific value to which the priority attribute is to be adjusted e.g. a listing may be bumped by setting its priority timestamp to the present time or debumped by setting the timestamp to a defined past time (e.g. a predefined time period prior to the present time). Alternatively, the extent may not specified in the rule, in which case a predefined default bumping/debumping behaviour may be applied.

Examples of rules may include:
As soon as a listing hits a defined KPI threshold (e.g. X replies within time window Y), DEBUMP the listing by modifying the priority timestamp by a set value (e.g. reduce the timestamp by two weeks)
If a listing does not meet/exceed a specified KPI, i.e. a specified number of replies after a specified time duration, BUMP the listing by setting the timestamp to the current time
If a listing hits a given KPI (e.g. X replies within time window Y), FREEZE the listing.

Each of these rules could be made specific to one or more user segments, and different versions could be defined for different user segments (e.g. with different KPI thresholds and/or time windows applying to different user segments). For example, rules could include:
If a listing achieves a KPI of 5 replies within 3 days for sellers in the "power seller" category, debump the listing
If a listing achieves a KPI of 7 replies within 1 week for sellers in the "casual seller" category, debump the listing.

Further rules could be defined in relation to user segments only, e.g.:
Automatically debump listing for sellers in the "parasites" segment.

Thus, in such a case, debumping is automatic without requiring a KPI trigger.

Additionally, rules may specify one or more listings categories to which the rule applies. This may allow different versions of rules to be created (e.g. using different KPI thresholds) for different categories of products sold through the platform.

In addition to bumping/debumping actions, "freeze" actions may also be specified. Freezing a listing preferably involves deactivating or suspending the listing so that it will no longer be displayed to users (e.g. following a search) and/or so that replies can no longer be created for the listing. This may be implemented, for example, via a flag in the listings database. A notification is then sent to the user (e.g. by email or as a smartphone notification) advising the user of the deactivation and providing an option (e.g. a link) to reactivate the listing. Typically, the KPI for a freeze action may be set higher than for a debump action (e.g. the KPI threshold could be set at twice the corresponding threshold for the debump action).

The rules, specifying KPI and user segment criteria and actions to be triggered are preferably stored as part of system configuration (e.g. as rule set 207) and can be modified by system administrators to change the system behaviour.

In one embodiment, rules can be configured to apply to particular groups of users (where the groupings are independent of the dynamic user segmentation discussed above). In one example, the online listings platform may provide region-specific marketplaces, and a particular rule can specify a region to which it applies. The rule is then applied only to listings created by users associated with the region. This allows the effectiveness of rules to be tested by applying them to specific regions, whilst retaining other regions in which the rule is not used (thus serving as a control). The effectiveness of the rule in improving overall listing exposure and transaction completion can then be measured to determine whether a rule is effective.

The actions specified for any rules whose trigger conditions are met are stored in action list 208. The list is then subsequently processed and the specified actions are applied to the listings in the listings database 116, resulting in modifications to the priority timestamps of relevant listings (or disabling of listings for freeze actions). These timestamp manipulations affect the search ordering applied during future user searches, thereby influencing the relative exposure of different listings. For example, debumping a listing by a sufficient amount (e.g. two weeks) can result in a listing appearing far down in the search results, meaning the listing is unlikely to be viewed by users except in the case of a highly focused search matching the listing. Conversely, bumping by resetting its priority timestamp to the current time causes the listing to appear early in any search results, improving the likelihood of the listing being viewed by users. In this way, overall exposure may be balanced out across the whole set of active listings over time.

The rules may be combined to implement complex system behaviour to manage listing exposure (liquidity). For example, a combination of rules may be specified to:
  Automatically debump listings for certain user segments (e.g. "parasites")
  Debump listings for other users on attainment of a first KPI condition
  Freeze listings that achieve a second KPI condition (in one example the KPI threshold may be set at twice the corresponding threshold for the first KPI condition)
  Bump listings failing to achieve a third KPI condition (this could be the same as the first KPI condition or could be different)

Search

The listings browser 106 provides a search function allowing a user to identify listings meeting user-specified criteria. The search criteria are submitted in a search request to the listings browser by the client device and may, for example include one or more relevant listings categories, one or more keywords, price, location etc.

In response to the search request, the listings browser then performs a search to identify relevant listings that match the specified criteria (e.g. by matching search keywords to listing titles or descriptions). In one embodiment, only active listings are included (i.e. expired or frozen listings would not be included).

The matching listings are ordered based (at least in part) on the priority timestamp, with the most recent priority timestamp appearing first in the results and the results then ordered in decreasing priority timestamp order. Other ordering criteria could additionally be used (e.g. to place sponsored listings early in the listings). The listings are then output (e.g. on a search results page) to the user. If needed the results may be divided into multiple pages in accordance with the priority ordering. Thus, the listings with the most recent priority timestamps will be presented on the first page, and other listings will only become visible if the user chooses to display further pages.

In this approach, the search result ordering is thus applied by the analysis process manipulating priority attributes (in the example embodiment, priority timestamps). When a search request is processed, the results are output in a search order determined based on the current values of the priority attribute (e.g. the currently valid priority timestamps), as modified during the most recent run of the listings analyser. Alternatively, the ordering could be applied dynamically, by identifying the search results in response to a search and executing the FIG. 2 process for the identified results at the time of the search.

Furthermore, in this example the search ordering is imposed by the listings browser in the backend (i.e. at listings platform 102) and the user device receives the search as an ordered list of listings. However, in alternative implementations the ordering could be carried out at the client.

System Architecture

The processes described above may be performed by one or more network-connected computing nodes (e.g. physical or virtual servers).

Figure 5:
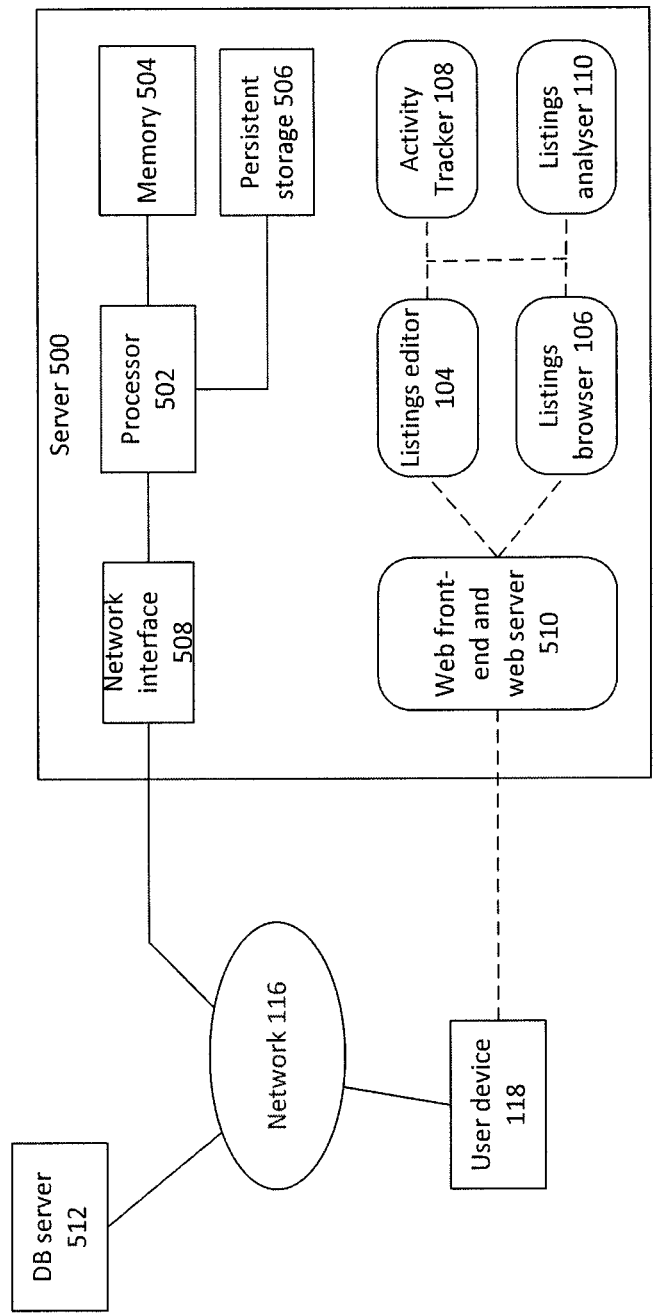
FIG. 5 illustrates a hardware/software architecture of a server for use in implementing described processes according to one embodiment.

FIG. 5 illustrates the hardware and software architecture of a server 500 for use in implementing the described processes. The server includes one or more processors 502 together with volatile/random access memory 504 for storing temporary data and software code being executed.

Persistent storage 506 (e.g. in the form of hard disk storage, optical storage and the like) persistently stores software modules for implementing the online listings platform 102 together with associated data. Modules may, for example, include the listings editor 104, listings browser 106, activity tracker 108 and listings analyser 110 described above. A front-end module 510 is also provided, here implemented as a web front-end and web server for providing access to the system to user devices 118. The persistent storage also includes other server software and data (not shown), such as a server operating system.

A network interface 508 is provided for communication with other system components such as a database server 512 (for storing database 112 of FIG. 1) and user devices 118 over one or more networks 116 (e.g. Local or Wide Area Networks, including the Internet).

While a specific architecture is shown by way of example, any appropriate hardware/software architecture may be employed.

Furthermore, functional components indicated as separate may be combined and vice versa. For example, the functions of database server 512 may be integrated into server 500. Furthermore, the depicted software functions 104, 106, 108, 110, 510 may be distributed across multiple servers in any suitable fashion. For example, in various embodiments, the system functionality may be implemented as a set of modular software services implemented across multiple servers. Some or all of these may be implemented as cloud-based services.

It will be understood that the present invention has been described above purely by way of example, and modification of detail can be made within the scope of the invention.

The invention claimed is:

1. A computer-implemented method of accessing data content in a data management system, the data management system adapted to enable system users to submit and share content items, the method comprising:
   storing a plurality of content items in a database, each content item associated with an item creator, wherein the item creator is a system user who submitted the content item;
   recording activity data relating to user interactions with content items;
   analysing the activity data, the analysing comprising, for each of a plurality of users:
      analysing activity data relating to content items submitted by the user; and
      assigning a user classification to the user in dependence on the analysis of the activity data;
   the method further comprising:
      receiving a search request specifying one or more search criteria;
      identifying a plurality of content items in dependence on the search criteria;
      sorting the identified items in accordance with a sort order determined in dependence on user classifications assigned to the item creators of the identified content items; and
      outputting search results identifying at least a subset of the identified content items, the search results sorted in accordance with the sort order.

2. The method of claim 1, wherein the analysing step comprises, for a given user, determining an interaction count indicating a number of user interactions, preferably of a predetermined interaction type, by other users with content items submitted by the given user, and assigning a user classification to the user based on the interaction count.

3. The method of claim 2, wherein the analysing step comprises, for a given user, determining a submission count indicating a number of content items submitted by the user, and assigning a user classification to the user in dependence on the submission count.

4. The method of claim 3, further comprising comparing one or both of the interaction count and the submission count to corresponding interaction or submission counts of one or more other system users, and assigning the user classification based on the comparison.

5. The method of claim 4, further comprising comparing the user to a cohort of users, optionally including all users, the method preferably including one or more of:
   assigning a first category to a user having a higher interaction count than a first predetermined proportion of the cohort and a higher submission count than a second predetermined proportion of the cohort;
   assigning a second category to a user not having a higher interaction count than the first predetermined proportion of the cohort and not having a higher submission count than the second predetermined proportion of the cohort;
   assigning a third category to a user having a higher interaction count than the first predetermined proportion of the cohort and not having a higher submission count than the second predetermined proportion of the cohort;
   assigning a fourth category to a user not having a higher interaction count than the first predetermined proportion of the cohort and having a higher submission count than the second predetermined proportion of the cohort.

6. The method of claim 1, further comprising storing a priority attribute for each content item, the sort order determined in dependence on the priority attributes of the identified content items, wherein the priority attributes of one or more of the content items are determined in dependence on the user classifications.

7. The method of claim 6, further comprising:
   setting an initial value for the priority attribute of each content item when the content item is created;
   analysing the activity data; and
   modifying the priority attribute value of one or more content items in dependence on the analysis;
   preferably wherein the priority attribute value of a given content item is modified in dependence on the user classification assigned to the item creator of the content item.

8. The method of claim 7, wherein the analysing step further comprises determining for each content item an interaction count specifying a number of interactions with the content item, preferably of a predetermined interaction type and/or determined over a predetermined time window, and performing the modifying step in dependence on the interaction counts.

9. The method of claim 8, further comprising computing a plurality of interaction counts for each content item, each interaction count relating to user interaction over a respective time window, the method preferably comprising comparing multiple interaction counts defined over respective time windows to respective thresholds.

10. The method of claim 7, further comprising performing the modifying step in dependence on a set of rules, each rule specifying one or more rule conditions and a modifying action, the method optionally comprising, for each of a plurality of content items:
   determining one or more rules of the set of rules applicable to the content item in dependence on the rule conditions; and
   performing the modifying actions specified by the determined applicable rules.

11. The method of claim 10, further comprising, in response to the determining step, recording the modifying actions in an action list, the performing step comprising transmitting the action list to the content item database, and applying the actions at the content item database.

12. The method of claim 10, wherein a rule condition for a given rule specifies at least one of:
   one or more user categories to which the rule applies;
   a user interaction threshold, or
   a time window associated with a user interaction threshold.

13. The method of claim 10, wherein rule actions comprise one or more of:
- a promote action to promote a content item, where promoting a content item preferably comprises setting the content item's priority attribute to a value indicating an increased priority;
- a demote action to demote a content item, wherein demoting a content item preferably comprises setting the content item's priority attribute to a value indicating a reduced priority; or
- a suspend action to suspend a content item, preferably wherein the system limits interaction with suspended content items and/or wherein suspended content items are not included in search results;
- optionally wherein a given promote or demote action specifies a parameter indicating a priority increment or decrement or an absolute priority value, the modifying step comprising modifying the priority attribute of a content item to which the rule applies in accordance with the specified parameter.

14. The method of claim 1, wherein the analysing step is performed prior to receipt of the search request and/or is repeated periodically.

15. The method of claim 1, wherein analysing activity data comprises analysing a predetermined type of user interactions with content items, the predetermined type of user interactions preferably comprising reply actions performed in relation to content items by users other than the item creators.

16. The method of claim 1, wherein priority attributes associated with content items comprise date and/or time values, the method comprising setting an initial value of a priority attribute for a content item to a value specifying a creation or submission time of the content item.

17. A data management system adapted to enable system users to submit and share content items, the data management system comprising at least one processor and associated memory configured to:
- store a plurality of content items in a database, each content item associated with an item creator, wherein the item creator is a system user who submitted the content item;
- record activity data relating to user interactions with content items;
- analyse the activity data, the analysing comprising, for each of a plurality of users:
  - analysing activity data relating to content items submitted by the user; and
  - assigning a user classification to the user in dependence on the analysis of the activity data;
- receive a search request specifying one or more search criteria;
- identify a plurality of content items in dependence on the search criteria;
- sort the identified items in accordance with a sort order determined in dependence on user classifications assigned to the item creators of the identified content items; and
- output search results identifying at least a subset of the identified content items, the search results sorted in accordance with the sort order.

18. A tangible computer-readable medium comprising software code adapted, when executed on a data processing apparatus, to perform a method comprising:
- storing a plurality of content items in a database, each content item associated with an item creator, wherein the item creator is a system user who submitted the content item;
- recording activity data relating to user interactions with content items;
- receiving a search request specifying one or more search criteria;
- identifying a plurality of content items in dependence on the search criteria;
- sorting the plurality of content items in accordance with a sort order determined at least in part in dependence on the recorded activity data, such that, for one or more content items, placement of a content item having a given item creator in the sort order is dependent on user interactions with other content items submitted by the given item creator; and
- outputting search results identifying at least a subset of the identified content items sorted in accordance with the sort order.

* * * * *